PRIOR ART

INVENTORS
FRANK J. THOMAS
JOHN S. RUSZALA
BY Herbert L. Davis
ATTORNEY

INVENTORS
FRANK J. THOMAS
JOHN S. RUSZALA
BY Herbert L. Davis
ATTORNEY

United States Patent Office 3,523,195
Patented Aug. 4, 1970

3,523,195
FUNCTION GENERATOR NETWORK UTILIZING A TRANSISTOR INCLUDING A MULTIPLE TAP EMITTER FOLLOWER

Frank John Thomas, West Paterson, and John Stanley Ruszala, Elizabeth, N.J., assignors to The Bendix Corporation, a corporation of Delaware Filed June 7, 1967, Ser. No. 644,221
Int. Cl. G06g 7/12, 7/24
U.S. Cl. 307—229 6 Claims

ABSTRACT OF THE DISCLOSURE

A function generator network utilizing a transistor including a multiple tap emitter follower to provide a plurality of reference voltages at low source impedances for back biasing diodes of the function generator to determine the break points thereof so that the diodes may selectively act to implement an electrical function by changing the network resistance in response to magnitude of an input voltage, thereby providing a composite of linear segmented slopes, and the transistor having a base-to-emitter junction resistance which changes in response to a change in the ambient temperature prevailing at the associated diodes of the function generator and in a sense to compensate for change in the resistance or voltage drop across the associated diodes of the function generator due to a change in the effective ambient temperature.

BACKGROUND OF THE INVENTION

Field of the invention

The present invention relates to a function generator network to implement an electrical function obtained by changing the network resistance as a function of an input voltage, together with low source resistance means for controlling the network changing means while compensating for changes in the ambient temperature.

DESCRIPTION OF THE PRIOR ART

Heretofore there has been provided a function generator network such as shown diagrammatically by FIG. 1 to implement an electrical output function shown graphically at FIG. 2, as hereinafter described.

In the prior art network of FIG. 1, this electrical output function is obtained by changing output resistances of the function generator network as a function of an input voltage applied from a variable source of electrical energy so as to provide a composite of linear segmented slopes.

Reference voltages provided by resistor divider networks of the function generator serve to control the output resistances of the function generator by determining the back biasing voltages applied to diodes controlling the output resistances and thereby the "break points" of the graphical representation of the electrical output function shown by FIG. 2.

The network of the function generator of FIG. 1 has two main disadvantages in that the voltage drops associated with the respective control diodes will change upon a change in the ambient temperature causing the curve of the electrical output function of the graph of FIG. 2 to shift with a resultant change in the "break points" of the electrical output function curve; while the resistor divider networks of FIG. 1, which establish the respective reference voltages, must provide low source resistances, which in a passive network, such as shown by FIG. 1, results in relatively high power consumption.

Thus in the prior art network of FIG. 1, the result obtainable in the passive network is provided only at the expense of power consumption and further there is no means provided for compensating the resistor network upon changes in the voltage drops associated with the diodes due to changes in the ambient temperature which in turn cause the curve of the graph of FIG. 2 to shift.

SUMMARY OF INVENTION

In distinction, the present invention contemplates the provision of a function generator network such as disclosed in the prior art network of FIG. 1, except that instead of utilizing low resistance voltage dividing networks to effect the reference voltages to determine the "break points" of the graph of FIG. 2, in the present invention there is utilized a transistor having a multiple tap emitter follower resistance means to provide the several reference voltages at low source impedances and through a proper selection of the transistor there is effected upon a change in the ambient temperature a corresponding change in the resistance of the base-to-emitter junction of the transistor so as to effectively compensate for the changes in the voltage drop or resistance of the several associated output control diodes of the function generator due to such changes in the ambient temperature.

An object of the invention therefore is to provide a low impedance source to effect the required reference voltages for back biasing the respective diodes controlling the output resistances of the function generator network through the provision of a transistor including a multiple tap emitter follower resistance means to provide the required reference voltages at a reduction in power consumption.

Another object of the invention is to provide a transistor cooperatively arranged in relation to said multiple tap emitter follower resistance means and including a base-to-emitter junction in which the resistance to current flow decreases with an increase in the ambient temperature so as to compensate for a corresponding decrease in the resistance of the control diodes of the function generator network in response to such increase in the ambient temperature effecting both the base-to-emitter junction of the transistor as well as the respective diodes controlling the output resistance network of the function generator.

Another object of the invention is to utilize a transistor having a multiple tap emitter follower to establish the required reference voltages for back biasing the respective diodes of the function generator network from a low impedance source so as to effect a reduction in the required power consumption while at the same time the base-to-emitter junction of the transistor also serves to compensate upon changes in the ambient temperature for corresponding changes in the junction voltage drops of the respective diodes of the function generator network.

Another object of the invention is to provide in a dual function generator network operative upon a reversal of polarity of input voltage and including two complementary function generator networks of the aforenoted improved type so coupled as to handle, respectively, both positive and negative input voltages and in which there is provided as low impedance sources of the reference voltages, a transistor of one conductive type utilizing a multiple tap emitter follower resistance means to establish the required reference voltages for the respective control diodes of one of the complementary function generator networks and another transistor of an opposite type utilizing a multiple tap emitter follower resistance means to establish the required reference voltages for the respective control diodes of the other of said complementary function generator networks so that the two complementary function generator networks are coupled to handle positive and negative input voltages and effect the required reference voltages from a low impedance source and at a reduction in power consumption, while the base-to-emitter junction of the transistor of said one type and the base-to-emitter junction of the transistor of the other type are also effective upon changes in the ambient temperature to compensate for resultant changes in the junction voltage drops of the respective control diodes of the two complementary function generator networks.

These and other objects of the invention are pointed out in the following description in terms of the embodiment thereof which are shown in the accompanying drawings. It is to be understood, however, that the drawings are for the purpose of illustration only and are not a definition of the limits of the invention, reference being had to the appended claims for this purpose.

DESCRIPTION OF THE DRAWINGS

In the several drawings in which corresponding numerals indicate corresponding parts.

DESCRIPTION OF THE INVENTION

Figure 1:
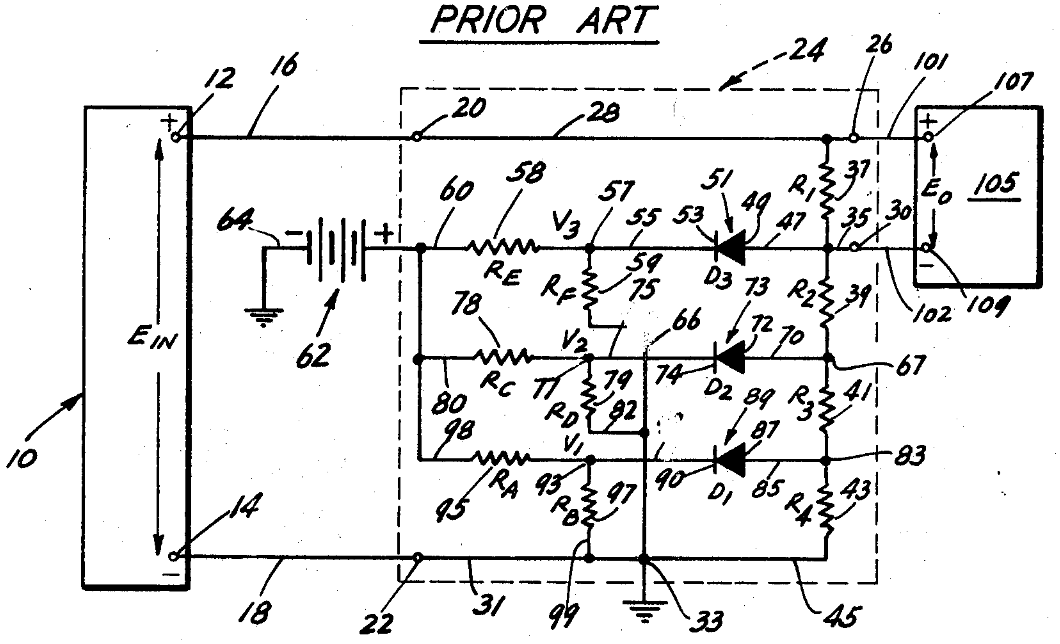
FIG. 1 shows a wiring diagram of a typical prior art type function generator network.

Referring first to the prior art network of FIG. 1, an electrical output function is obtained by changing the output resistance of the function generator network as a function of an input voltage applied from a variable source of D.C. electrical energy 10. The source 10 may be of a conventional variable D.C. type having a positive terminal 12 and a negative terminal 14 connected to electrical output conductors 16 and 18, respectively, leading to input terminals 20 and 22 of a function generator network 24 having an output terminal 26 connected to the input terminal 20 by an electrical conductor 28.

The opposite electrical input terminal 22 is connected by a conductor 31 to a grounded output 33. Further leading from an opposite output terminal 30 is a conductor 35 and connected across the output conductor 28 and the output conductor 35 is a resistor 37 having a value $R_1$. Further serially connected between the output conductor 35 and the grounded input conductor 31 are resistors 39, 41 and 43 having resistance values, respectively, $R_2$, $R_3$ and $R_4$. The end of the resistor 43 is in turn connected by a conductor 45 to the grounded conductor 31.

Further it will be noted that in the function generator network 24 of FIG. 1, the electrical output conductor 35 is also connected by a conductor 47 to an anode element 49 of a diode 51 having a cathode element 53. The diode 51 has a resistance value $D_3$ which decreases with an increase in the effective ambient temperature. Further the cathode element 53 of the diode 51 is connected by an electrical conductor 55 to a point 57 intermediate a pair of voltage dividing resistors 58 and 59 of respective values $R_E$ and $R_F$. The resistor 58 is connected at an opposite end by a conductor 60 to a positive terminal of a constant source of electrical energy or biasing voltage 62 having a negative terminal connected by an electrical conductor 64 to ground while the opposite end of the resistor 59 is connected by a conductor 66 to the grounded terminal 33. Further leading from a tap 67 intermediate the output resistors 39 and 41 is a conductor 70 which leads to an anode element 72 of a diode 73 having a cathode element 74. The diode 73 has a resistance value $D_2$ which decreases with an increase in the effective ambient temperature. Further cathode element 74 is connected by an electrical conductor 75 to a point 77 intermediate the voltage dividing resistors 78 and 79 of respective values $R_C$ and $R_D$. An opposite end of the resistor 78 is connected through a conductor 80 to the conductor 60 leading from the positive terminal of the source of direct current 62, while an opposite end of the resistor 79 is in turn connected through a conductor 82 to the conductor 66 leading to the grounded terminal 33.

Further leading from a tap 83 intermediate the output resistors 41 and 43 is a conductor 85 which leads to an anode element 87 of a diode 89 having a cathode element 90. The diode 89 has a resistance value $D_1$ which decreases with an increase in the effective ambient temperature. Further cathode element 90 is connected by a conductor 92 to a point 93 intermediate voltage dividing resistors 95 and 97 of respective values $R_A$ and $R_B$. The resistor 95 is connected at an opposite end through a conductor 98 to the conductor 60 leading to the positive terminal of the battery 62 while the resistor 97 is connected by a conductor 99 to the grounded terminal 33. The output terminals 26 and 30 are in turn connected by conductors 101 and 102 to input terminals 107 and 109 of a device 105 to be operated thereby, and in response to the output voltage $E_o$ applied across the output terminals 26 and 30.

Figure 2:
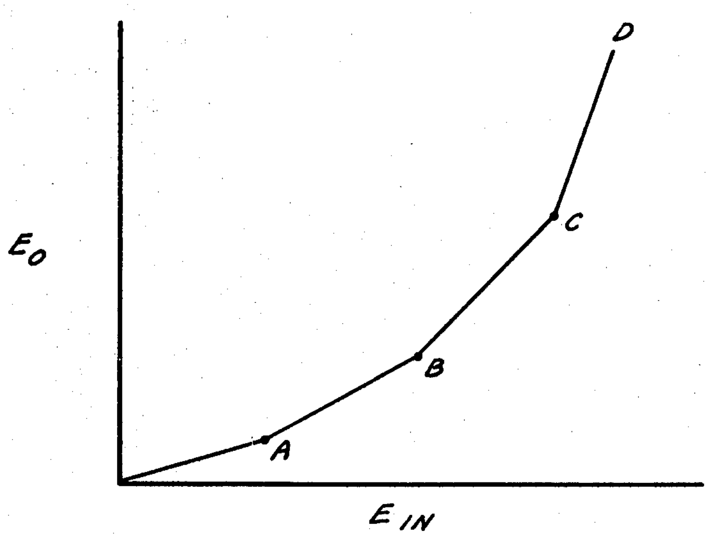
FIG. 2 is a graphical illustration of an electrical function that may be implemented by the function generator network shown in FIG. 1.

The voltage dividing resistors 95–97, 78–79 and 58–59 are so arranged as to apply at the points 93, 77 and 57 reference voltages $V_1$, $V_2$ and $V_3$, respectively, of different successively greater values so as to apply at the cathode elements 90, 74 and 53 of the diodes 89, 73 and 51 a progressively increasing back biasing voltage to determine the "break points" A, B and C, shown on the graph of FIG. 2.

Thus as the input voltage applied across the terminals 12 and 14 of the variable source of voltage 10 is progressively increased, first the back biasing voltage applied to the diode 89 is overcome to permit passage through the diode 89 of current when the voltage drop across the resistor 43 having the resistance value of $R_4$ exceeds the reference voltage $V_1$ plus the voltage drop across the diode 89, whereupon the resistor 43 of the value $R_4$ is essentially shorted, causing a slope of the transfer function to change, as indicated between the points A and B of the graph of FIG. 2.

Similarly, upon the input voltage $E_{in}$ applied across the input conductors 16 and 18 being increased through the break point B as shown in the graph of FIG. 2, the diode 73 becomes conductive to cause a slope of the transfer function of the graph of FIG. 2, to change as indicated between the points B and C, and similarly upon the input voltage $E_{in}$ further increasing to the break point C, the diode 51 then becomes conductive to effect a change in the slope of the transfer function, as indicated between the points C and D of FIG. 2.

The prior art function generator network of FIG. 1 has two decided disadvantages in that the voltage drops associated with the diodes 89, 73 and 51 having the respective resistance values $D_1$, $D_2$ and $D_3$ will change with variations in the ambient temperature so as to effect upon an increase in the ambient temperature a decrease in the resistance thereof and a corresponding decrease in the voltage drop across such diodes so as to in turn cause the curve of the graph of FIG. 2 to shift. Moreover the resistor divider networks 95–97, 78–79 and 58–59, of the network of FIG. 1, requires a low impedance and corresponding high power consumption to effect the desired result.

IMPROVED FUNCTION GENERATOR NETWORK

Figure 3:
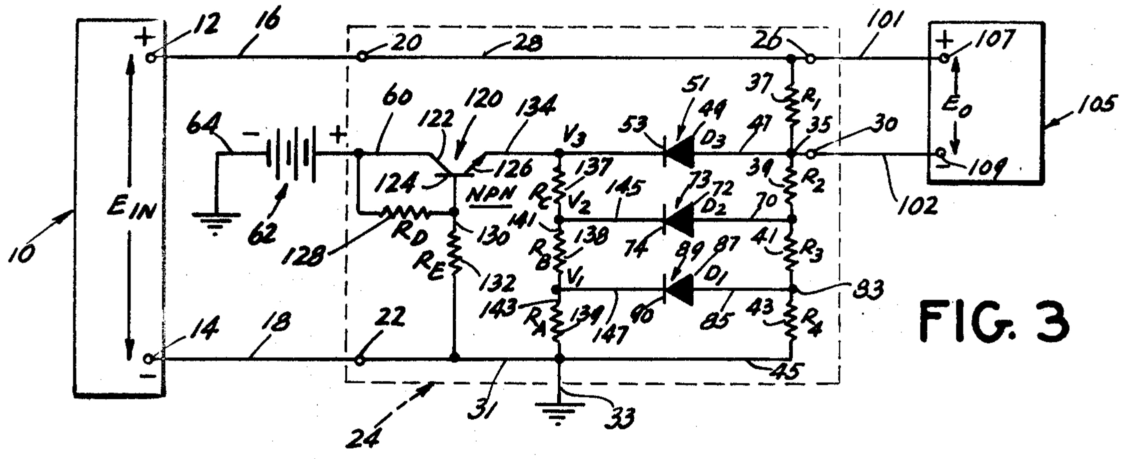
FIG. 3 is a wiring diagram showing an improved function generator network embodying the present invention and utilizing a transistor having a multiple tap emitter follower resistance means to establish the required reference voltages from a low impedance source and at a reduction in power consumption from that of the relatively low resistance voltage divider network of the prior art function generator network of FIG. 1 and in which in the improved function generator network of FIG. 3 the base-to-emitter function of the transistor also serves to compensate for changes in the junction voltage drops of the diodes of the function generator network due to changes in the prevailing ambient temperature.

Referring now to the drawing of FIG. 3, there is shown an improved function generator network embodying the present invention and arranged to overcome the aforenoted shortcomings of the prior art function generator network shown in FIG. 1. Thus in the improved function generator network 24 of FIG. 3, there is utilized, instead of the resistor divider networks 58–59, 78–79 and 95–97, of FIG. 1, an improved arrangement to effect the reference voltages $V_1$, $V_2$ and $V_3$, including a low impedance source in which an NPN type transistor 120 is provided having a collector element 122, a base element 124 and an emitter element 126. The collector element 122 is connected by the conductor 60 to the positive terminal of the battery 62 which has a negative terminal thereof connected to ground through a conductor 64. Further a resistor 128 having a resistance value $R_D$ is connected between the conductor 60 and a conductor 130 leading from the base element 124 of the transistor 120 while an additional resistor 132 having the resistance value $R_E$ leads from the conductor 130 to the grounded conductor 31.

Further leading from the emitter element 126 of the NPN type transistor 120 is a conductor 134 which leads to the cathode element 53 of the diode 51 which is operative as heretofore explained with reference to the function generator network of FIG. 1. Further connected between the conductor 134 and the grounded conductor 33 are a series of serially connected multiple tap emitter follower low impedance resistors 137, 138 and 139, respectively, to provide a low impedance source of reference voltages.

In the aforenoted arrangement, the resistor 137 of a low impedance value $R_C$ is connected to the resistor 138 by a conductor 141 while the resistor 138 of different low impedance value $R_B$ is connected by a conductor 143 to the resistor 139 of a still different low impedance value $R_A$. Further a conductor 145 leads from the conductor 141 to the cathode element 74 of the diode 73, while an additional conductor 147 leads from the conductor 143 to the cathode element 90 of the diode 89.

The improved function generator network is such then that the multiple tap emitter follower low impedance resistors 137, 138 and 139 are utilized to establish the required reference voltages from the low impedance source provided by the transistor 120 at a substantial reduction in power consumption from that of the low impedance resistor divider networks 58–59, 78–79 and 95–97 of FIG. 1.

Furthermore, the resistance of a base-to-emitter junction of the elements 124 and 126 of the transistor 120 decreases with an increase in the ambient temperature and is so selected as to tend to compensate for decreases in the resistance of diodes 51, 73 and 89 due to such increase in the ambient temperature and thereby effectively compensates for changes in the junction voltage drops of the diodes 51, 73 and 89 of the function generator network of FIG. 3 which occurs upon changes in the ambient temperature acting upon the transistor 120 as well as the diodes 51, 73 and 89.

In the aforenoted improved function generator network of FIG. 3, upon a zero input signal being received across the input lines 16 and 18, the diodes 51, 73 and 89 are back biased and the transfer function may be readily seen from the following formula:

$$\frac{E_o}{E_{in}}=\frac{R_1}{R_1+R_2+R_3+R_4}$$

When the input at line 16 is increased in a positive sense to the point indicated graphically in FIG. 2 at A where the voltage drop across the reactor 43 of the value $R_4$ exceeds a value equivalent to the voltage $V_1$ plus the voltage drop $VD_1$ across the diode 89, the resistor 43 of the value $R_4$ is essentially shorted by the passage of current through the diode 89 causing the slope of the transfer to function graphically in FIG. 2 at A to change to $$\frac{E_o}{E_{in}}=\frac{R_1}{R_1+R_2+R_3}$$

This procedure is continued as the input voltage increases resulting in a function which is concave upward, as shown graphically in FIG. 2.

Figure 4:
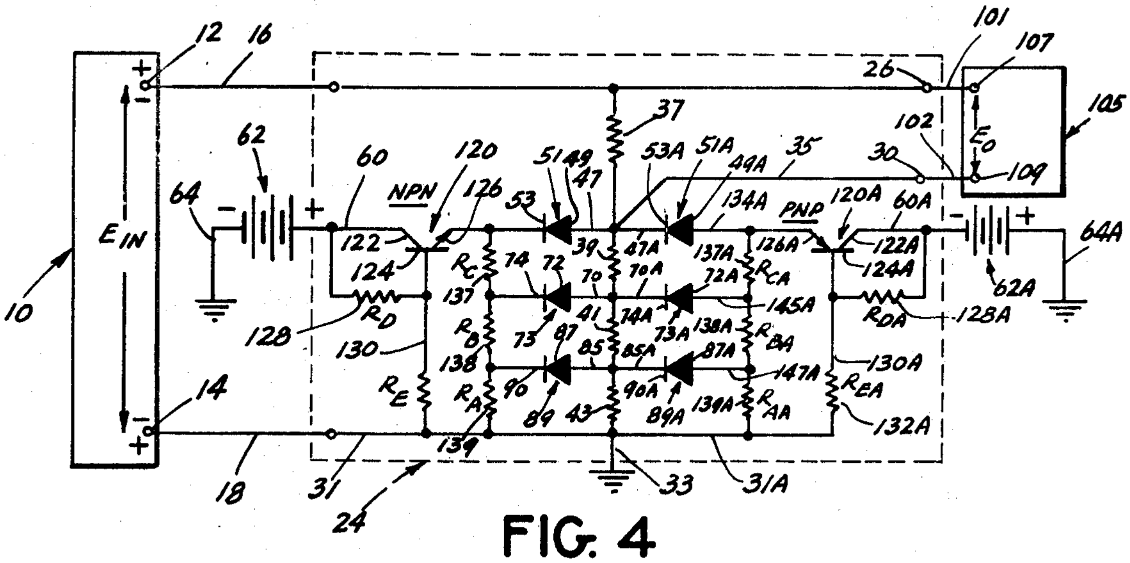
FIG. 4 is a further modified form of the improved function generator network of FIG. 3, in which there is provided two complementary function generator networks coupled to handle positive and negative input voltages and both of which complementary function generator networks include transistors of opposite conductive types utilizing multiple tap emitter follower resistance means to establish the required reference voltages for the respective output control diodes of the function generator networks from low impedance sources and at a reduction in power consumption, while the base-to-emitter junction of the respective transistors also serve to compensate for changes in the junction-to-voltage drop of the control diodes of the complementary function generator networks due to the changes in the prevailing ambient temperature.
Figure 5:
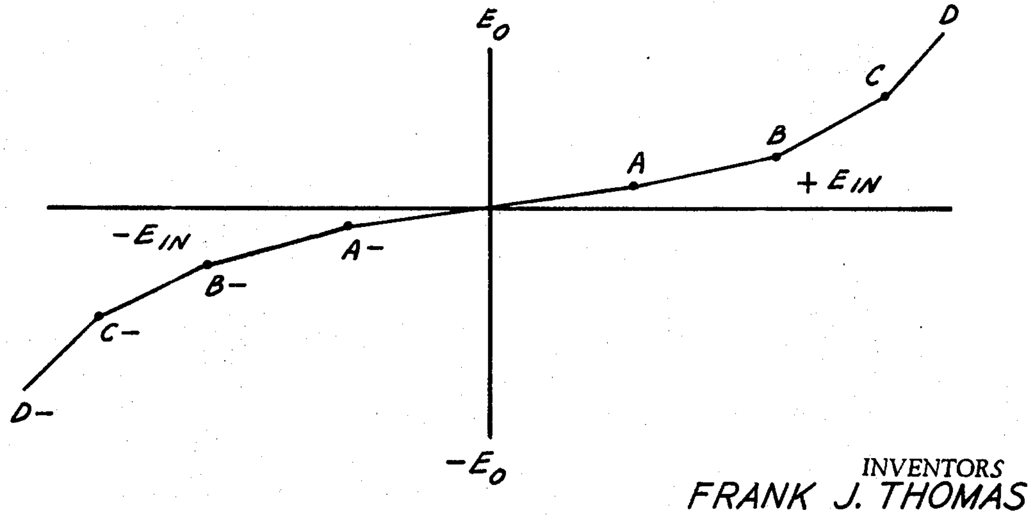
FIG. 5 is a graphical illustration of the electrical function implemented by the electrical network of FIG. 4 and particularly illustrating the transfer characteristics of the two complementary function generator networks coupled to handle positive and negative input voltages applied to the networks of FIG. 4.

FIG. 4 shows the present invention applied to a pair of complementary function generator networks coupled so as to handle positive and negative input voltages. The transfer characteristics of the network of FIG. 4 are shown graphically in FIG. 5.

The operative parts of that portion of the function generator network of FIG. 4 arranged to handle negative input voltages, as distinguished from positive input voltages, have been indicated by corresponding numerals to those parts of that portion of the function generator network of FIGS. 3 and 4 arranged to handle the positive input voltages, except that the corresponding parts of the negative voltage handling portion of the function generator network bear the suffix A.

There is thus provided in the improved function generator network of FIG. 4 a pair of oppositely conductive type transistors 120 and 120A, each providing a multiple tap emitter follower low impedance resistance means 137, 138 and 139 and 137A, 138A and 139A to effect multiple reference voltage sources for operating the diodes 51, 73 and 89 of one portion of the function generator network and the diodes 51A, 73A and 89A of the complementary other portion of the function generator network, as shown by FIG. 4.

In the respective portions of the electrical function generator network of FIG. 4, the transistor 120 is of an NPN type while transistor 120A is of an oppositely conductive PNP type in which the collector 122A is connected through a conductor 60A to the negative terminal of a constant source of electrical energy or battery 62A having a positive terminal connected to ground by a conductor 64A.

In the electrical function generator network of FIG. 4, the PNP type transistor 120A includes a collector element 122A, a base element 124A and an emitter element 126A. The collector element 122A is connected by the conductor 60A to the negative terminal of the battery 62A which has a positive terminal thereof connected to ground through a conductor 64A. Further a resistor 128A having a resistance value $R_{DA}$ is connected between the conductor 60A and a conductor 130A leading from the base element 124A of the transistor 120A while an additional resistor 132A having the resistance value $R_{EA}$ leads from the conductor 130A to the conductor 31A which is in turn connected to the grounded conductor 33.

The resistance of a base-to-emitter junction of the elements 124A and 126A of the transistor 120A, as in the case of the base-to-emitter junction of the transistor 120A as heretofore explained, decreases with an increase in ambient temperature and is so selected as to tend to compensate for decreases in the resistance of diodes 51A, 73A and 89A due to such increase in the ambient temperature and thereby effectively compensates for changes in the junction voltage drops of the diodes 51A, 73A and 89A of the function generator network of FIG. 4 in like manner to the temperature compensating effect provided by the complementary transistor 120 for the diodes 51, 73 and 89, as heretofore explained with reference to the network of FIG. 3.

Thus in FIG. 4 there is provided a pair of complementary function generator networks each including (1) the temperature compensation feature, (2) multiple reference voltages derived from low source impedances for operating the diodes of the complementary networks at a low power consumption and (3) the complementary networks being so coupled as to handle both positive and negative input voltages.

What is claimed is:

1. In an electrical function generator network of a type including variable input voltage means, variable output resistor means, a plurality of diodes operably connected in parallel to said output resistor means and selectively operable to vary portions of the output resistor means upon the input voltage exceeding predetermined magnitiudes in one sense, and means for providing different reference voltages to bias the diodes in opposition to the input voltage acting in said one sense so as to determine the magnitudes of the input voltage to selectively render the diodes effective to vary the output resistor means; the improvement comprising said reference voltage means including a transistor having a collector element, a base element and an emitter element, a source of biasing voltage, means operably connecting the source of biasing voltage across the base and collector elements, multiple tap emitter follower resistor means connected between the emitter and base elements, means electrically connecting multiple taps of said emitter follower resistor means to said diodes for providing said different reference voltages to bias the diodes in opposition to the input voltage in said one sense so as to cause the diodes to selectively render the portions of the output resistors ineffective upon the input voltage exceeding said predetermined magnitudes in said one sense.

2. The improvement defined by claim 1 in which said reference voltage means includes another transistor of an opposite conductive type having a collector element, a base element and an emitter element, another source of biasing voltage, other means operably connecting the other source of biasing voltage across the base and collector elements of said other transistor, a plurality of other diodes operably connected in parallel to said output resistor means and selectively operable to vary portions of the output resistor means upon the input voltage exceeding predetermined magnitudes in an opposite sense, another multiple tap emitter follower resistor means connected between the emitter and base elements of said other transistor, means electrically connecting multiple taps of said other emitter follower resistor means to said other diodes for providing different reference voltages to bias said other diodes in opposition to the input voltage acting in said opposite sense so as to cause the other diodes to selectively render the portions of the output resistors ineffective upon the input voltage exceeding said predetermined magnitudes in said opposite sense.

3. The improvement defined by claim 1 which said transistor includes a base-to-emitter junction having a resistance variable with changes in ambient temperature to compensate for corresponding variations in resistance of said diodes upon said changes in the ambient temperature.

4. The improvement defined by claim 3 in which said reference voltage means includes another transistor of an opposite conductive type having a collector element, a base element and an emitter element, another source of biasing voltage, other means operably connecting the other source of biasing voltage across the base and collector elements of said other transistor, a plurality of other diodes operably connected in parallel to said output resistor means and selectively operable to vary portions of the output resistor means upon the input voltage exceeding predetermined magnitudes in an opposite sense, another multiple tap emitter follower resistor means connected between the emitter and base elements of said other transistor, means electrically connecting multiple taps of said other emitter follower resistor means to said other diodes for providing different reference voltages to bias said other diodes in opposition to the input voltage acting in said opposite sense so as to cause the other diodes to selectively render the portions of the output resistors ineffective upon the input voltage exceeding said predetermined magnitudes in said opposite sense, said other transistor including a base-to-emitter junction having a resistance variable with changes in the ambient temperature to compensate for corresponding variations in resistance of said other parallel connected diodes upon said changes in the ambient temperature.

5. In an electrical function generator network of a type including variable input voltage means, variable output resistor means, a plurality of diodes operably connected in parallel to said output resistor means and selectively operable to vary portions of the output resistor means upon the input voltage exceeding predetermined magnitudes in one sense, and means for providing different reference voltages to bias the diodes in opposition to the input voltage acting in said one sense so as to determine the magnitudes of the input voltage to selectively render the diodes effective to vary the output resistor means; the improvement comprising said reference voltage means including a transistor having a collector element, a base element and an emitter element, a source of biasing voltage, means operably connecting the source of biasing voltage across the base and collector elements, multiple tap emitter follower means connected between the emitter and base elements of the transistor for providing said different reference voltages to bias the diodes in opposition to the input voltages in said one sense, and said transistor including a base-to-emitter junction having a resistance variable with changes in ambient temperature to compensate for corresponding variations in resistance of said diodes upon said changes in the ambient temperature.

6. The improvement defined by claim 5 in which said reference voltage means includes another transistor of an opposite conductive type having a collector element, a base element and an emitter element, another source of biasing voltage, other means operably connecting the other source of biasing voltage across the base and collector elements of said other transistor, a plurality of other diodes operably connected in parallel to said output resistor means and selectively operable to vary portions of the output resistor means upon the input voltage exceeding predetermined magnitudes in an opposite sense, other multiple tap emitter follower means connected between the emitter and base elements of said other transistor for providing different reference voltages to bias the other diodes in opposition to the input voltage acting in said opposite sense, and said other transistor including a base-to-emitter junction having a resistance variable with changes in ambient temperature to compensate for corresponding variations in resistance of said diodes upon said changes in the ambient temperature.

References Cited

UNITED STATES PATENTS

| | | | |
|---|---|---|---|
| 3,192,405 | 6/1965 | Patchell | 307—310 XR |
| 3,322,971 | 5/1967 | Liu | 307—310 XR |

OTHER REFERENCES

Motorola Technical Disclosure, dated August 1963.

IBM Technical Disclosure Bulletin titled "Transistor With Small Temperature Dependence" by E. F. Yhap, vol. 4, No. 10, March 1962, p. 60.

STANLEY T. KRAWCZEWICZ, Primary Examiner

U.S. Cl. X.R.

235—197; 307—296, 310; 328—145; 330—143